(12) United States Patent
Bakenov

(10) Patent No.: US 10,347,947 B2
(45) Date of Patent: Jul. 9, 2019

(54) AQUEOUS LITHIUM-ION BATTERY

(71) Applicant: Nazarbayev University Research and Innovation System, Raion Esil, Astana (KZ)

(72) Inventor: Zhumabay Bakenov, Astana (KZ)

(73) Assignee: Nazarbayev University Research and Innovation System, Raion Esil, Astana 010000 (KZ)

( * ) Notice: Subject to any disclaimer, the term of this patent is extended or adjusted under 35 U.S.C. 154(b) by 109 days.

(21) Appl. No.: 14/422,534

(22) PCT Filed: Jan. 30, 2014

(86) PCT No.: PCT/KZ2014/000001
§ 371 (c)(1),
(2) Date: Feb. 19, 2015

(87) PCT Pub. No.: WO2015/023168
PCT Pub. Date: Feb. 19, 2015

(65) Prior Publication Data
US 2015/0207180 A1 Jul. 23, 2015

(30) Foreign Application Priority Data
Nov. 6, 2013 (KZ) .................................. 2013/1705

(51) Int. Cl.
*H01M 4/38* (2006.01)
*H01M 4/58* (2010.01)
(Continued)

(52) U.S. Cl.
CPC ........... *H01M 10/36* (2013.01); *H01M 4/381* (2013.01); *H01M 4/485* (2013.01);
(Continued)

(58) Field of Classification Search
CPC ...... H01M 10/36; H01M 4/485; H01M 4/381; H01M 4/58; H01M 4/5825
See application file for complete search history.

(56) References Cited

U.S. PATENT DOCUMENTS

| 2003/0124423 A1 | 7/2003 | Sasaki et al. |
| 2009/0087742 A1 | 4/2009 | Martinet et al. |

(Continued)

FOREIGN PATENT DOCUMENTS

| EP | 2390948 | 11/2011 | |
| EP | 2390948 A2 * | 11/2011 | ............. C01B 25/45 |

(Continued)

OTHER PUBLICATIONS

International Search Report and Written Opinion dated Aug. 28, 2014 received for PCT application No. PCT/KZ2014/000001.
(Continued)

*Primary Examiner* — Karie O'Neill Apicella
(74) *Attorney, Agent, or Firm* — Jose Gutman; Fleit Gibbons Gutman Bongini & Bianco P.L.

(57) ABSTRACT

A lithium-ion battery includes a cell placed into an electrically non-conducting box filled with an electrolyte. The cell includes an intercalation cathode and an electroconductive anode separated from each other by a porous separator. The cell is submerged into the electrolyte. The electrolyte includes an aqueous solution of metals salts. The aqueous solution includes metals ions of the metals salts. A pH value of the aqueous solution being adapted to prevent a hydrolysis of the metal ions in the electrolyte.

1 Claim, 5 Drawing Sheets

(51) Int. Cl.
*H01M 10/36* (2010.01)
*H01M 12/08* (2006.01)
*H01M 4/485* (2010.01)

(52) U.S. Cl.
CPC ......... *H01M 4/5825* (2013.01); *H01M 12/08* (2013.01); *H01M 2300/002* (2013.01); *H01M 2300/0005* (2013.01); *Y02E 60/128* (2013.01)

(56) References Cited

U.S. PATENT DOCUMENTS

| 2010/0136427 | A1* | 6/2010 | Kondo | H01M 4/485 429/207 |
| 2011/0289767 | A1 | 12/2011 | Yamazaki | |
| 2015/0207180 | A1 | 7/2015 | Bakenov | |

FOREIGN PATENT DOCUMENTS

| EP | 2034543 | | 12/2011 | | |
| EP | 2717377 | A1 * | 4/2014 | ............ | H01M 4/134 |
| EP | 2717377 | | 9/2014 | | |
| JP | 2006040571 | | 2/2006 | | |
| JP | 2012009432 | | 1/2012 | | |
| JP | 2014515546 | | 6/2014 | | |
| JP | 2015159121 | | 9/2015 | | |
| JP | 5883971 | | 3/2016 | | |
| JP | 6006789 | | 10/2016 | | |
| KR | 20110131095 | | 12/2011 | | |
| KR | 20140039022 | | 3/2014 | | |
| RU | 2403654 | | 11/2010 | | |
| RU | 2467434 | | 11/2012 | | |
| TW | 201222948 | | 6/2012 | | |
| WO | 2009057834 | | 5/2009 | | |
| WO | 2011044644 | | 4/2011 | | |
| WO | 2012122353 | | 9/2012 | | |
| WO | WO-2012122353 | A2 * | 9/2012 | .......... | H01M 2/0277 |
| WO | 2012163300 | | 12/2012 | | |

OTHER PUBLICATIONS

Summons to Attend Oral Proceedings for European Application No. 14836824.4 dated Apr. 6, 2018 Apr. 6, 2018.
Communication for European Patent Application No. PCT/KZ2014000001 dated Mar. 28, 2017.
European Search Report for European Patent Application No. EP 14836824 dated Mar. 16, 2017.
European Search Report for European Patent Application No. EP 14836824 dated Feb. 6, 2018.
Communication for European Patent Application No. 14836824.4 of the Result of Consultation dated Nov. 7, 2018.
Brief Communication for European Patent Application No. 14836824.4 advising the summons to attend oral proceedings is cancelled, dated Nov. 26, 2018.
Communication under Rule 71(3) EPC of the intention to grant a European application for European Patent Application No. 14836824.4, dated Dec. 21, 2018.

* cited by examiner

AQUEOUS LITHIUM-ION BATTERY

BACKGROUND

The present invention relates to the electrochemical industry, in particular, to aqueous lithium-ion batteries.

There is a known invention comprising a box, an anode, a cathode, an electrolyte (US Patent, WO 20111044644, 2011).

However, this invention has the following drawbacks:

1. Low specific energy capacity, i.e. a prolonged work on one charge is not provided, a frequent recharge is required, which limits their use in large-scale systems of energy storage, for example, from renewable sources;

2. Low cyclability, i.e. they lose very rapidly energy capacity and power upon the repeated charge/discharge processes (upon use); the battery is short-life, the service life is limited within several hundreds of charge/discharge cycles; furthermore, upon each cycle the battery capacity decreases considerably, which is due to the use of severe alkaline electrolyte leading to the degradation of intercalation electrodes (both anode and cathode). This is a main reason of low cyclability of the battery in this invention;

3. Presence of severe alkaline electrolyte (chemically aggressive, caustic) is dangerous for users and equipment in presence of leakage; it is required a resistant battery box from special severe alkaline-proof materials and careful isolation and sealing of battery elements during their production to prevent a leakage of the electrolyte, which leads to a considerable cost increase of the production.

There is a known invention, which is closest in view of its technical nature to the proposed solution, this known invention comprising a box, a cathode, an anode, a separator, an electrolyte (US Patent, US 20090087742, 2009).

However, this invention has the following drawbacks:

1. Low specific energy capacity, i.e. a prolonged work on one charge is not provided, a frequent recharge is required, which limits their use in large-scale storage systems, for example, of energy from renewable sources;

2. Low cyclability, i.e. they lose very rapidly energy capacity and power upon the repeated charge/discharge processes (upon use); the battery is short-life, the service life is limited within several hundreds of charge/discharge cycles; furthermore, upon each cycle the battery capacity decreases considerably, which is due to the use of severe alkaline electrolyte leading to the degradation of intercalation electrodes (both anode and cathode). This is a main reason of low cyclability of the battery in this invention;

3. Presence of severe alkaline electrolyte (chemically aggressive, caustic) is dangerous for users and equipment in presence of leakage; it is required a resistant battery box from special severe alkaline-proof materials and careful isolation and sealing of battery elements during their production to prevent a leakage of the electrolyte, which leads to a considerable cost increase of the production.

BRIEF SUMMARY

According to one embodiment of the invention, provided are batteries with a low cost, that are environmentally safe, and that provide reliable operation, a high capacity and a long service life.

A technical result of an embodiment of the invention improves operational performance of a battery, and reduces corrosive properties of the electrolyte providing reliability, a long service life, and environmental safety.

This technical result is achieved due to the fact that in the invention are used an intercalation cathode, a metallic and/or electroconductive inert anode separated by a separator with a subacid solution of the electrolyte with pH ~4-5 comprising at least two types of electrochemically active cations, and represented by a combination of one or a quantity of electrochemical elements each of which includes: the metallic anode from zinc, aluminum or another metal from a range of transition metals or the inert anode from stainless steel, carbon, nickel or copper; the cathode from oxides and salts of lithium, sodium, magnesium or other alkaline or alkaline earth metals with manganese, iron, cobalt, nickel and other transition metals, for example: $LiCoPO_4$, $LiMnPO_4$, $LiFePO_4$, $LiMn_2O_4$, $LiCoO_2$, $LiMn_{1/3}Ni_{1/3}O_4$ and/or their mixtures.

BRIEF DESCRIPTION OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

One embodiment of the invention includes:

- a cathode 1 comprising mixed salt of intercalating cations (alkaline and/or alkaline earth metals) with other metals and represent oxides, phosphates, silicates, sulfates, for example: $LiCoPO_4$, $LiMnPO_4$, $LiFePO_4$, $LiMn_2O_4$, $LiCoO_2$, $LiMn_{1/3}Ni_{1/3}O_4$ and/or their mixtures;
- an anode 2 consisting in zinc, aluminum or another metal from a range of transition metals or an inert anode from stainless steel or carbon.
- a separator 3 from a porous material (cotton, cellulose or commercial separators for batteries with electrolytes on aqueous base like Absorbed Glass Mat (AGM), non-woven separators or other separators from natural or synthetic materials); and
- a box 4 from polypropylene or other electrically nonconducting synthetic and polymer materials.

Assemblage and operation of the invention are carried out as follows.

Figure 1:
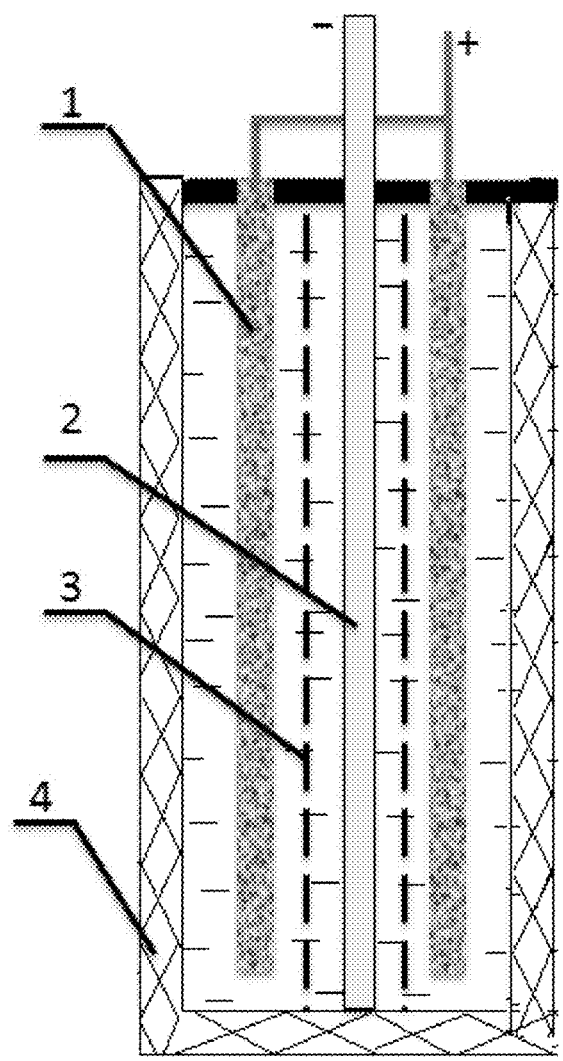
FIG. 1 is a schematic diagram of an aqueous lithium-ion battery where only one of its cell/element is represented.

The finished cathode 1 and anode 2, sunk into the separator 3, are placed in the box 4 of a cell of an element/battery, see FIG. 1.

The separator 3 is made from the mentioned materials according to the sizes required for this or the battery. For its assemblage the separator 3 may be used in dried condition and can be wet by an electrolyte at the end of the assemblage or directly before its use.

The electrolyte represents an aqueous solution of salts of the metals, ions of which may also be comprised in the composition of the cathode 1 and/or the anode 2, with a pH value (the solution acidity) preventing a hydrolysis of the metals ions of the electrolyte.

If the zinc anode and the $LiFePO_4$ cathode are used, in order to prevent the hydrolysis of the zinc ions dissolved in the electrolyte along with the lithium ions, pH of the electrolyte solution is maintained equal to ~4-5.

In case of other anode and cathode materials, the required pH of the electrolyte solution may be lower or higher than this value, but should not exceed pH ~8, above which the hydrolysis of majority of ions of metals, except alkaline and alkaline earth metals, takes place.

A mechanism of work of proposed in this invention the lithium-ion element/battery with the aqueous electrolyte, is described as follows.

Figure 2:
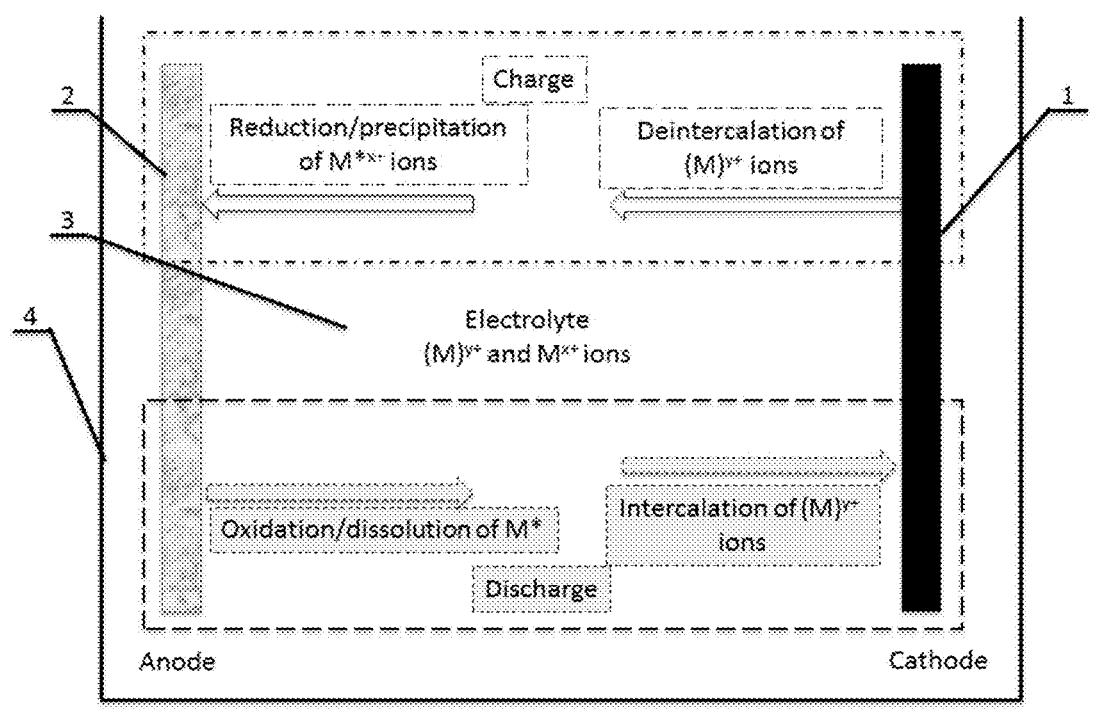
FIG. 2 is a schematic diagram of work of the aqueous lithium-ion battery.

During charge: a deintercalation (extraction) ion process of the alkaline or alkaline earth cation from a structure of the intercalation cathode takes place on the cathode 1; a process of discharge (reduction) of the cation of the anode 2 material or another ion takes place on the anode 2, see FIGS. 1 and 2.

The box 4 provides an isolation of the cells/elements of the battery from each other and from an environment.

During discharge, these electrochemical processes proceed in the opposite direction: an intercalation ion process of alkaline or alkaline earth cation into the structure of the intercalation cathode 1 takes place on the cathode 1, and a process of dissolution (oxidation) of the cation of the anode 2 material or another ion takes place on the anode 2, see FIGS. 1 and 2.

The electrolyte comprising into the separator 3 represents the aqueous solution with pH ~4-5 comprising at least two electrochemically active cations, that allows a reduction on the anode 2 of the cation (positive ion) which is not included in the composition of the cathode 1, see FIG. 2.

A chemical energy is transformed into the electric one due to the electrochemical reactions proceeding on the cathode 1 and on the anode 2 of the element. An electric current begins to flow through the system when the cathode 1 and the anode 2 are connected via an external circuit.

Figure 3:
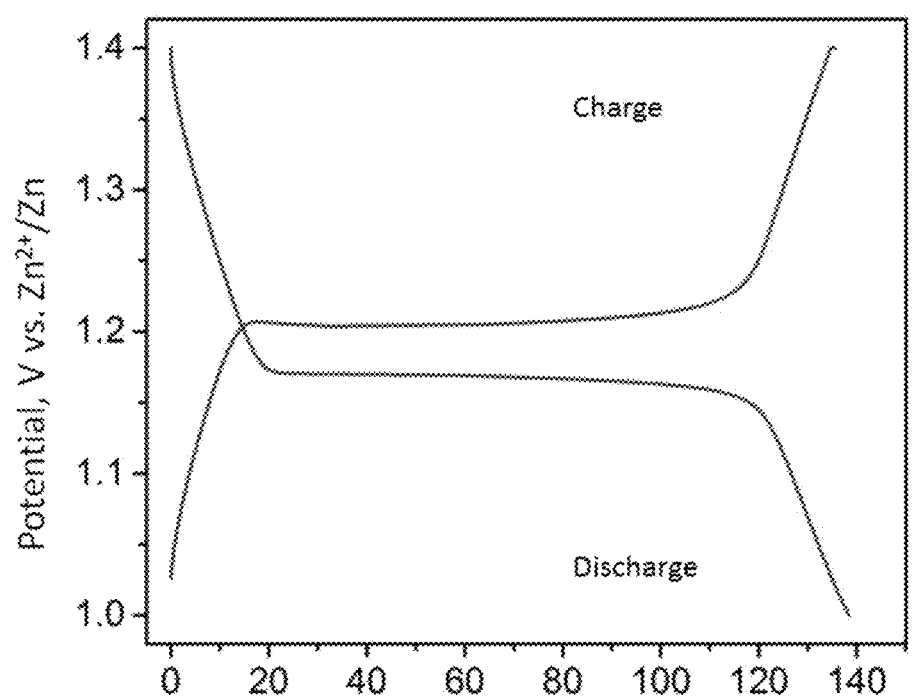
FIG. 3 is a graph of potential variation of the lithium-ion battery with an aqueous electrolyte, with a $LiFePO_4$ cathode as an example, during its charge and discharge under a constant current between specified ranges of values of the potentials: the upper during the charge and the lower during the discharge.

In FIG. 3, as an example, is shown a profile of potential variation in the proposed in the invention lithium-ion battery with the aqueous electrolyte, with the $LiFePO_4$ cathode 2, has a horizontal plateau at its operating voltage which represents a difference of the cathode 1 and anode 2 potentials. Ranges of the potentials, the upper during charge and the lower during discharge, are determined by the materials of the electrodes (cathode 1 and anode 2).

Figure 4:
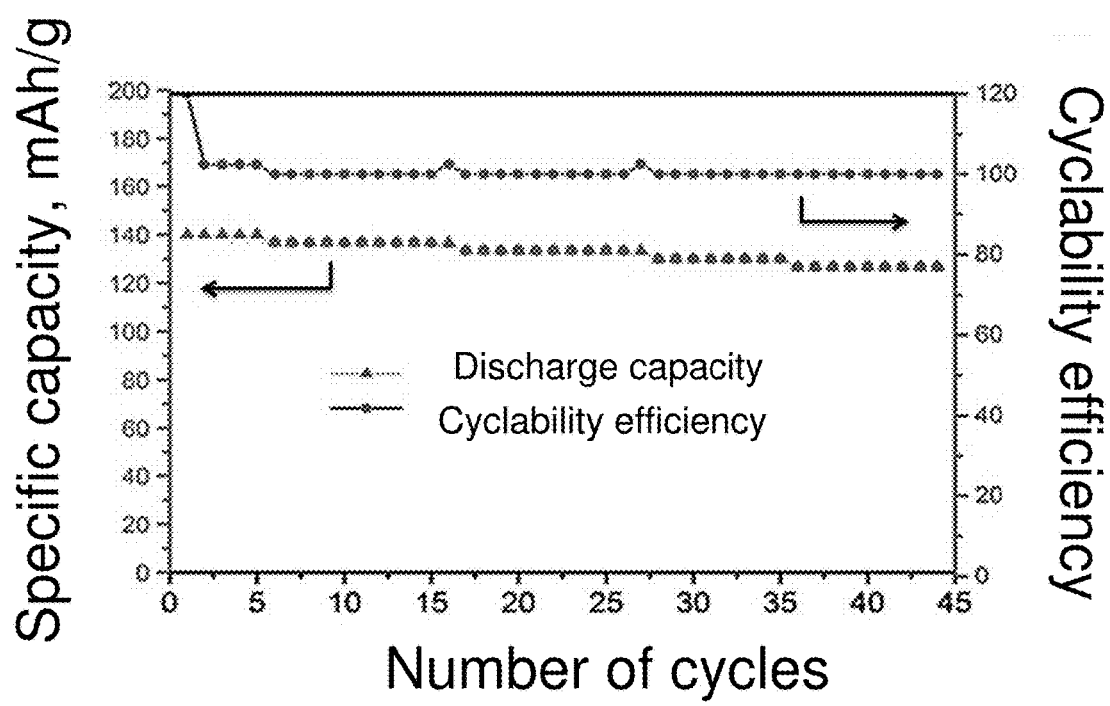
FIG. 4 is, as an example, a graph of cyclability and of cyclability efficiency of the lithium-ion battery with the aqueous electrolyte, with the $LiFePO_4$ cathode, and the ranges of values of the potentials: the upper during the charge and the lower during the discharge versus a zinc anode 1-4 V.

FIG. 4 shows a high cyclability of this battery.

Figure 5:
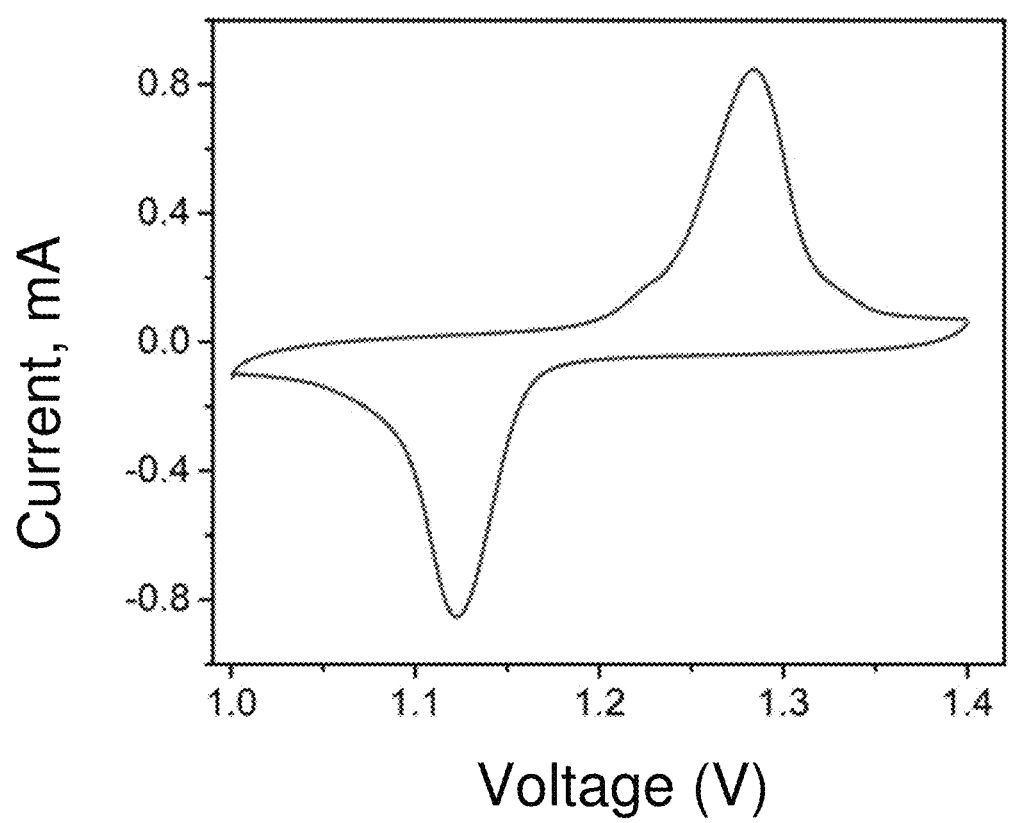
FIG. 5 is, as an example, a cyclic voltammogram of the aqueous lithium-ion battery with the aqueous electrolyte, with the $LiFePO_4$ cathode.

In FIG. 5 it is shown a cyclic voltammogram of proceeding of the anodic and cathodic processes into the aqueous lithium-ion battery with the $LiFePO_4$ cathode 1 and the zinc anode 2. A presence of only reversible peaks of the main cathodic process, oxidation-reduction of $LiFePO_4$, indicates no side processes in operation.

The illustrations of examples described herein are intended to provide a general understanding of the structure of various embodiments, and they are not intended to serve as a complete description of all the elements and features of devices, apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The Figures are also merely representational and may not be drawn to scale. Certain proportions thereof may be exaggerated, while others may be minimized. Accordingly, the specification and drawings are to be regarded in an illustrative rather than a restrictive sense. Additionally, unless otherwise specifically expressed or clearly understood from the context of use, a term as used herein describes the singular or the plural of that term.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The corresponding structures, materials, acts, and equivalents of any means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope of the examples presented or claimed. The disclosed embodiments were chosen and described in order to explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

The invention claimed is:

1. A lithium-ion battery comprising a cell including an intercalation cathode and an electroconductive inert anode separated from each other by a porous separator, the cell being submerged into an electrolyte, the electrolyte comprising an aqueous solution of metals salts, the aqueous solution comprising metals ions of the metals salts, the metals ions comprising at least first electrochemically active cations and second electrochemically active cations, the first electrochemically active cations being comprised in a first material of the intercalation cathode, the second electrochemically active cations being comprised in a second material of the electroconductive inert anode,
  wherein the cell is placed into a box from electrically nonconducting synthetic polymer material, said box providing an isolation from an environment,
  wherein a pH value of the aqueous solution is adapted to prevent a hydrolysis of the metals ions in the electrolyte, and
  wherein the first material of the intercalation cathode comprises a mixed salt of intercalating alkaline metal and intercalating alkaline earth metal cations with other metals and represents oxides, phosphates, silicates, sulfates.

* * * * *